US009003353B2

(12) United States Patent
Goyal et al.

(10) Patent No.: US 9,003,353 B2
(45) Date of Patent: Apr. 7, 2015

(54) ACTIVITY POINTS BASED EFFORT ESTIMATION FOR PACKAGE IMPLEMENTATION

(75) Inventors: Abhishek Goyal, Dehradun (IN); Nikhil Kumar, Delhi (IN); Vinay Kumar Jain, Delhi (IN); Abhishek Sabharwal, Lucknow (IN)

(73) Assignee: Infosys Limited, Bangalore (IN)

( * ) Notice: Subject to any disclaimer, the term of this patent is extended or adjusted under 35 U.S.C. 154(b) by 182 days.

(21) Appl. No.: 13/403,875

(22) Filed: Feb. 23, 2012

(65) Prior Publication Data

US 2013/0167107 A1 Jun. 27, 2013

(30) Foreign Application Priority Data

Dec. 27, 2011 (IN) .......................... 4598/CHE/2011

(51) Int. Cl.
*G06F 9/44* (2006.01)
*G06F 9/445* (2006.01)

(52) U.S. Cl.
CPC ........................................ *G06F 8/60* (2013.01)

(58) Field of Classification Search
USPC ........................................................ 717/101
See application file for complete search history.

(56) References Cited

U.S. PATENT DOCUMENTS

| 6,073,107 A | 6/2000 | Minkiewicz et al. | |
| 6,601,233 B1* | 7/2003 | Underwood | 717/102 |
| 6,658,643 B1* | 12/2003 | Bera | 717/101 |
| 6,938,007 B1 | 8/2005 | Iulianello et al. | |
| 7,328,202 B2 | 2/2008 | Huang et al. | |
| 7,801,834 B2* | 9/2010 | Frohnhoefer et al. | 717/101 |
| 8,230,385 B2* | 7/2012 | Meyer | 717/101 |
| 8,418,123 B2* | 4/2013 | Kamiyama et al. | 717/101 |
| 2003/0018952 A1* | 1/2003 | Roetzheim | 717/101 |
| 2003/0101114 A1* | 5/2003 | Delapass et al. | 705/31 |
| 2003/0149745 A1* | 8/2003 | Dunay et al. | 709/217 |

(Continued)

FOREIGN PATENT DOCUMENTS

JP 2006134225 5/2006

OTHER PUBLICATIONS

Ooi et al. "Developing an Activity-based Costing Approach for System Development and Implementation", ACM, Summer 2003, vol. 34, No. 3.*

(Continued)

*Primary Examiner* — Anna Deng
*Assistant Examiner* — Junchun Wu
(74) *Attorney, Agent, or Firm* — Klarquist Sparkman, LLP

(57) ABSTRACT

Techniques and solutions are provided for determining overall effort for a package implementation program. Determining overall effort can comprise determining a program parameter complexity value for each of a plurality of program parameters, determining activities for program phases and program work streams, calculating an activity point value for each determined activity, and calculating overall effort for the package implementation program. The activity point values can be calculated using, at least in part, the program parameter complexity values. Calculating the overall effort can use, at least in part, the activity point values and a pre-determined productivity metric that is specific to a type of the package implementation program.

15 Claims, 10 Drawing Sheets

(56) References Cited

U.S. PATENT DOCUMENTS

| | | | |
|---|---|---|---|
| 2004/0194055 A1* | 9/2004 | Galloway et al. | 717/101 |
| 2004/0243996 A1* | 12/2004 | Sheehy et al. | 717/174 |
| 2005/0086045 A1* | 4/2005 | Murata | 704/2 |
| 2005/0114829 A1* | 5/2005 | Robin et al. | 717/101 |
| 2006/0053149 A1* | 3/2006 | Iwasaki et al. | 707/102 |
| 2007/0011496 A1* | 1/2007 | Ahmad et al. | 714/39 |
| 2007/0074148 A1* | 3/2007 | Morgan | 717/101 |
| 2007/0276712 A1* | 11/2007 | Kolanchery et al. | 705/7 |
| 2008/0320447 A1* | 12/2008 | Chang | 717/121 |
| 2009/0100404 A1* | 4/2009 | Chaturvedi et al. | 717/101 |
| 2009/0249278 A1* | 10/2009 | Roth et al. | 717/101 |
| 2010/0036715 A1* | 2/2010 | Sathyan et al. | 705/11 |
| 2010/0198631 A1* | 8/2010 | Edwards et al. | 705/7 |
| 2011/0016447 A1 | 1/2011 | Goel et al. | |
| 2012/0179508 A1* | 7/2012 | Sefland | 705/7.27 |

OTHER PUBLICATIONS

Francalanci, "Predicting the implementation effort of ERP projects: empirical evidence on SAP/R3", Journal of Information Technology, 2001, pp. 33-48.*

Bundschuh et al. "The IT Measurement Compendium"—Chapter 8 "Product and Process Metrics", Springer Berlin Heidelberg, 2008, pp. 207-239.*

Parthasarathy et al., "Conceptual Alternative Approaches to Application Services Pricing," Infosys White Paper, 9 pages, Sep. 2009.

Raghavan et al., "SYSPOINT: Unit of Measure for IT Infrastructure Project Sizing," *Journal of Computing and Information Technology* (*Cit*), pp. 31-46, 2004.

Ooi et al., "Developing an Activity-based Costing Approach for System Development and Implementation," *The DATA BASE for Advances in Information Systems*, vol. 34, No. 3, pp. 54-71, Aug. 2003.

\* cited by examiner

FIG. 5

EFFORT ESTIMATION TOOL

Activities  510

| Program Phase | Activity | Work Stream | In Scope? | |
|---|---|---|---|---|
| Program Phase 1 | Activity 1-1 | Work Stream 1 | Yes | |
| Program Phase 1 | Activity 1-2 | Work Stream 1 | Yes | |
| Program Phase 1 | Activity 1-3 | Work Stream 1 | Yes | 520 |
| Program Phase 1 | Activity 1-4 | Work Stream 2 | No | |
| Program Phase 1 | Activity 1-5 | Work Stream 3 | Yes | |
| Program Phase 2 | Activity 2-1 | Work Stream 3 | Yes | |
| Program Phase 2 | Activity 2-2 | Work Stream 1 | Yes | |
| Program Phase 2 | Activity 2-3 | Work Stream 1 | Yes | 530 |
| Program Phase 2 | Activity 2-4 | Work Stream 4 | Yes | |
| Program Phase 2 | Activity 2-5 | Work Stream 4 | Yes | |
| Program Phase 3 | Activity 3-1 | Work Stream 1 | No | 540 |
| Program Phase 3 | Activity 3-1 | Work Stream 4 | No | |

EFFORT ESTIMATION TOOL

Calculated Activity Complexity Values

| Activity | Parameter 1 | Parameter 2 | Parameter N | Activity Complexity Value |
|---|---|---|---|---|
| Activity 1 | weight | weight | weight | ☐ |
| Activity 2 | weight | weight | weight | ☐ |
| Activity 3 | weight | weight | weight | ☐ |
| ... | ... | ... | ... | |
| Activity N | weight | weight | weight | ☐ |

610 → Activity
620 → Parameter 2
630 → Activity Complexity Value

FIG. 9 Example Program Estimation Framework

ACTIVITY POINTS BASED EFFORT ESTIMATION FOR PACKAGE IMPLEMENTATION

BACKGROUND

Accurately estimating the effort needed to complete a large sized package implementation program can be a difficult task. An inability to accurately estimate effort can result in significant schedule and cost overruns. Therefore, the ability to accurately estimate the effort needed to complete a package implementation program can be essential to the success of the package implementation program.

Large sized package led transformation programs have become more complex with the growing business challenges faced by today's global enterprises, making it more important for program managers to do thorough ground work during the pre-initiation phase of the program. Accurately determining the scope of the package implementation program is an important aspect used in deriving the cost and schedule of the program. Accurate estimation also is an essential part of the sales process for the Service Providers for Package Implementation Services.

Existing effort estimation approaches and tools are lacking when it comes to performing a holistic estimate of the program. Effort estimation tools such as those that use SMC algorithms (Simple/Medium/Complex), lines of code (LOC), and function point (FP) approaches are not able to provide estimates for the entire breadth of the package implementation program, and often focus on technical effort or functional effort. Existing approaches and tools do not cover all the work streams of the Package Implementation program such as Training, Organization Change Management, Program Management, Testing, Performance Management, Configuration, Requirement Gathering, Design, Planning, and Business Process Reengineering.

Therefore, there exists ample opportunity for improvement in frameworks and approaches related to estimating effort for package implementation programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for determining overall effort of a package implementation program. For example, a tool and/or framework can calculate estimates using one or more of the following techniques: determining program parameters, determining program complexity parameters, determining program phases, determining program work streams, determining program activities, calculating activity complexity values, calculating activity point values, calculating effort, and calculating overall program effort. Effort can be calculated and/or reported based on, for example, program phase, program work stream, and role.

According to one aspect of the techniques and tools described herein, a method is provided for determining overall effort for a package implementation program. The method comprises determining a program parameter complexity value for each of a plurality of program parameters, determining activities for program phases and program work streams, calculating an activity point value for each determined activity, and calculating overall effort for the package implementation program. The activity point values can be calculated using, at least in part, the program parameter complexity values. Calculating the overall effort can use, at least in part, the activity point values and a pre-determined productivity metric that is specific to a type of the package implementation program. The method can further comprise outputting (e.g., saving, displaying, and/or sending) the calculated overall effort for the package implementation program.

According to another aspect of the techniques and tools described herein, a computing device is provided for determining overall effort for a package implementation program. The computing device comprises a display, a memory, and a processing unit, where the computing device is configured for performing operations comprising determining a program parameter complexity value for each of a plurality of program parameters, determining activities for program phases and program work streams, calculating an activity point value for each determined activity, and calculating overall effort for the package implementation program. The activity point values can be calculated using, at least in part, the program parameter complexity values. Calculating the overall effort can use, at least in part, the activity point values and a pre-determined productivity metric that is specific to a type of the package implementation program. The operations can further comprise outputting (e.g., saving, displaying, and/or sending) the calculated overall effort for the package implementation program The foregoing and other objects, features, and advantages of the invention will become more apparent from the following detailed description, which proceeds with reference to the accompanying figures.

BRIEF DESCRIPTION OF THE DRAWINGS

FIG. 5 is an example user interface for determining activities for a package implementation program.

FIG. 6 is an example user interface displaying calculated activity complexity values.

DETAILED DESCRIPTION

Figure 1:
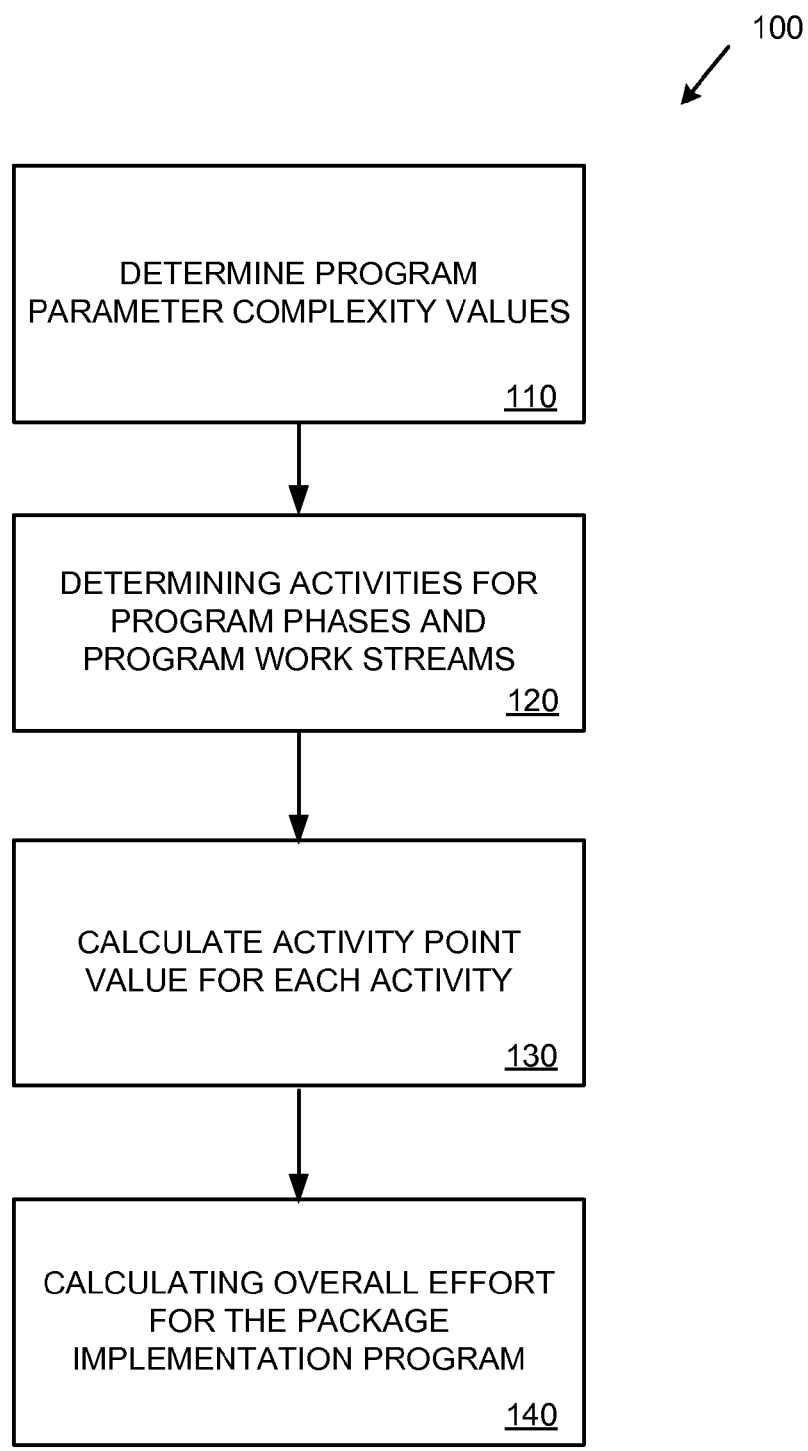
FIG. 1 is a flowchart depicting an example method for determining overall effort for a package implementation program.

The following description is directed to techniques and solutions for determining overall effort for a package implementation program. In the techniques described herein, an activity-point-based approach is used to estimate effort needed to implement a package (e.g., to implement a large software package for a business or organization). An approach based on activity points can provide an overall effort estimate which can take into account package implementation effort from the beginning of the process (e.g., planning stages) through completion (e.g., deployment, testing, and follow-up support).

In different embodiments, one or more of the following approaches can be applied in an activity-point-based approach to determining overall effort for a package implementation program:

The program can be divided into components including program work streams and program phases.

Program activities and associated program roles can be identified for various program work streams and program phases.

Activity points (AP) can be determined for each activity using program parameter complexity values, scope, deliverables, and/or heuristics.

Program productivity (PP) metrics can be used to calculate activity level effort in person-months. An overall effort in person-months can also be calculated. The program productivity metric used can be specific to a type of the program.

An effort estimation tool can be provided for receiving answers to questions and for receiving selection of activities, from which the tool can determine end-to-end effort for the package implementation program in activity points which can be converted to overall effort in person-months (e.g., using a baseline program productivity metric).

Package Implementation Programs

In the techniques and solutions described herein, a package implementation program is a program to implement a software package. For example, a software package implementation program can comprise implementing a large and complex software package, such as an Enterprise Resource Planning (ERP) package (e.g., an Oracle® ERP package or a SAP® ERP package). A package implementation program does not refer to a software development project. Instead, a package implementation program refers to various implementation tasks and activities (e.g., program management, requirements, design, configuration, setup, testing, training, documentation, deployment, support, etc.) that are involved with setting up a software package. While the tasks and activities involved with a package implementation program may involve some custom software development (e.g., to implement features not provided for with the software package), there are many other non-software-development related tasks and activities involved.

A package implementation program can comprise (e.g., can be divided into) program work streams and program phases. Program work streams and program phases can be further defined by activities that can occur within each program phase and/or program work stream. Program phases, program work streams, and/or activities can be selected to define the scope of the package implementation program.

In some embodiments, estimating effort of a package implementation program does not involve estimating the effort of software development for any technical components (e.g., estimating development effort can be performed by other tools). However, overall technical effort can still be considered in the overall effort calculation as it affects related activities.

Program Parameters

In the techniques and solutions described herein, program parameters can be used to define different aspects of a package implementation program. For example, the program parameters can be used to organize various questions, the answers to which can be used to derive program parameter complexity values, which can then be used in various effort calculations.

In some embodiments, a package implementation program can be organized using ten program parameters. The ten program parameters comprise: an organization program parameter, a current information technology (IT) landscape program parameter, a program core team readiness program parameter, a stakeholders program parameter, a process program parameter, a statutory/legal program parameter, a product fitment program parameter, a technology program parameter, a program approach program parameter, and a people transformation program parameter. In other embodiments, different or additional program parameters can be used.

Program parameters can be associated with a set of questions. For example, an "organization" program parameter can include questions such as:

What is the estimated size of the program in terms of end-users?

How many lines of business are within the scope of the program?

How many languages are being implemented as part of the program scope?

In a specific embodiment, each program parameter is associated with a plurality of questions.

Questions can be associated with a set of answers. For example, a question such as "What is the estimated size of the program in terms of end-users?" can be associated with a set of answers. For example, the "What is the estimated size of the program in terms of end-users?" question can be associated with the following five answers: <100, 100-250, 251-500, 501-1000, and >1000. Other questions can have different types of associated answers. For example, the question "How many lines of business are within the scope of the program?" can be associated with the following five answers: 1, 2, 3, 4, and >4. The question "What is the skill set level for the selected program?" can be associated with the following five answers: very low, low, medium, high, and very high.

In some embodiments, each question can be associated with a set of five answers, with each of the five answers corresponding to an answer complexity value from 1 to 5. For example, the question "How many lines of business are within the scope of the program?" can be associated with the following five answers: 1, (associated an answer complexity of 1), 2, (associated with an answer complexity of 2), 3, (associated with an answer complexity of 3), 4, (associated with an answer complexity of 4), and >4, (associated with an answer complexity of 5). The question "What is the skill set level for the selected program?" can be associated with the following five answers: very low (associated an answer complexity of 1), low (associated an answer complexity of 2), medium (associated an answer complexity of 3), high (associated an answer complexity of 4), and very high (associated an answer complexity of 5).

In some embodiments, each question can be associated with a "firm answer/assumed answer" selection. For example, a manager can associate an answer to a question with the designation "firm answer" or the designation "assumed answer." The selection can then be used, at least in part, in determining risk (e.g., reliability) of the effort estimate.

In some embodiments, reusability information is also received. For example, a manager can input information (e.g., percentage values) related to reusability parameters for functional, technical, program management, training, etc. The reusability values can then be used in the overall effort calculation.

Calculating Program Parameter Complexity Values

In some embodiments, program parameter complexity values can be calculated based on other values or parameters. For example, a program parameter can be associated with one or more questions (e.g., each program parameter can have its associated list of questions). Each question can have a number of answers (e.g., a pre-determined number of answers). Each answer can be associated with a complexity value. For example, an Organization program parameter could have an associated question such as, "Please provide an estimate of the number of end users for this program." This question could have pre-configured answer options of: <100, 100-250, 251-500, 501-1000, and >1000. Each answer option could have an associated complexity value (e.g., the <100, answer could have an associated complexity of 1, the 100-250, answer could have an associated complexity of 2, and so on). In order to calculate a program parameter complexity value, the individual complexity values of the answers for each associated question can be used. For example, the individual complexity values can be averaged to determine the program parameter complexity value, or a weighted sum of the individual complexity values can be used.

In a specific embodiment, each program parameter has a number of associated questions. Each question has pre-configured answer options each associated with a complexity value. Furthermore, each question is associated with a weight value. In order to calculate a program parameter complexity value for the program parameter, a weighted sum of all the program parameter's questions is calculated. For example, consider a specific program parameter with two questions, with the first question having a weight value of 0.6 and the second question having a weight value of 0.4, and where each question has associated answers with complexity values from 1-5. If a user completes the first question with an answer associated with complexity value 2, and the second question with a complexity value of 5, then the program parameter complexity value would be calculated (using the weighted sum of this specific implementation) as: $0.6*2+0.4*5=3.2$. The weight values of the questions associated with each program parameter can total 1.0.

Determining Program Phases and Work Streams

In some embodiments, program phases and work streams related to the package implementation program are determined. Program phases refer to the phases involved with implementation of the program. In a specific embodiment, the package implementation program is divided into the following phases: package evaluation, business case and program roadmap, program set direction, process modeling/blueprinting, solution design, configuration and development, testing, training, deployment and cutover, and post-go-live support. The phases of the package implementation program are generally used to divide the program into phases that cover the overall project from start to finish.

In some situations, a package implementation program may not involve all program phases (e.g., only some of a set of pre-configured program phases may be utilized in the current package implementation program). For example, depending on the situation, some phases may not be needed for the specific package implementation program (e.g., the package evaluation or support phase may not be needed in a specific situation). In order to develop an accurate estimate for the effort needed to implement the package implementation program, only those phases that will be used for the specific package implementation program can be selected. For example, a user interface can be provided for user-selection of those phases that will be utilized.

Program work streams generally refer to the management needs of the package implementation program. In a specific embodiment, the package implementation program includes the following program work streams: program management, program setup, strategic planning, legal and contractual compliance, knowledge management, stakeholder management, organization change management, financial management, risk management, governance and communication, project management, performance management, and delivery management.

In some situations, a package implementation program may not involve all program work streams (e.g., only some of a set of pre-configured program work streams may be used in the current package implementation program). In order to develop an accurate estimate for the effort needed to implement the package implementation program, only those work streams that will be used for the specific package implementation program can be selected. For example, a user interface can be provided for user-selection of those work streams that will be utilized.

Determining Activities

In the techniques and solutions described herein, the program phases of a package implementation program are defined by the activities performed within each phase. For example, a "package evaluation" phase could have associated activities, such as: "study and document existing IT landscape" and "prepare and conduct product demonstrations." In addition to being associated with phases, activities can also be associated with program work streams and/or roles (e.g., the group responsible for activity).

The activities involved with a package implementation program can vary depending on the needs of the specific package implementation program. For example, a specific package implementation program may only use some activities from a list of possible activities. The activities involved with a package implementation program can be determined based on manual selection (e.g., manual selection by a user), automated selection (e.g., automatically selected based on selection of other parameters, such as program parameters, program phases, program work streams, and/or roles), or a combination of manual and automated selection.

In some embodiments, activities are selected based at least in part upon selected program phases and program work streams. For example, each activity can be associated with a specific program phase and a specific work stream. If a specific program phase is selected (e.g., selected by a user via a user interface), then those activities associated with the specific program phase can be automatically selected. Similarly, if a specific program work stream is selected (e.g., selected by a user via a user interface), then those activities associated with the specific program work stream can be automatically selected. A specific activity can be unselected if its associated program phase is not selected, if its associated work stream is not selected, or if both its program phase and work stream are not selected. In some embodiments, after the automatic selection of activities is performed (based on selected program phases and program work streams), a manual selection can also be performed (e.g., a user can review the activities that have been automatically selected/unselected and manually change which activities are selected/unselected). Providing for user review and modification of the automatic activity selection allows the user to tailor which activities are within the scope of the package implementation program.

In other embodiments, activities can be selected based on criteria other than, or in addition to, selected program phases and program work streams. For example, activities can be selected manually (e.g., not based on selection of other parameters). As another example, activities can be selected based on program parameters and/or roles.

Calculating Activity Complexity Values

In the techniques and solutions described herein, activity complexity values can be calculated. For example, activity complexity values can be calculated for each activity that has been selected to be a part of a package implementation program.

In some embodiments, activity complexity values are calculated using, at least in part, program parameter complexity values. For example, for each activity, the program parameter complexity values for one or more program parameters associated with the activity can be averaged to calculate the activity complexity value for the activity.

In some embodiments, program parameter complexity values are weighted. For example, a weight value can be applied for each program parameter for each activity. The weight value can be multiplied by the program parameter complexity value and a sum of results (e.g., a weighted sum) for all the program parameters can be used as the activity complexity value. For example, a first program parameter could have a complexity value of 3.7, and a second program parameter could have a complexity value of 2.0. For a first activity, the weight for the first program parameter could be 40, and the weight for the second program parameter could be 60. The activity complexity value for the first activity could then be calculated as: (3.7*40+2.0*60)/100=2.68. By providing weight values for each program parameter for each activity, the complexity value for the activity can be influenced differently for each program parameter. In addition, if a weight value for a specific program parameter for a specific activity is set to zero, then that program parameter will have no influence for that activity.

Calculating Activity Points

In the techniques and solutions described herein, activity point values can be calculated. For example, activity point values can be calculated for each activity that has been selected to be a part of a package implementation program.

In some embodiments, activity point values are calculated using, at least in part, activity complexity values. For example, activity complexity values can be calculated within a specific range (e.g., range from 1, to 5). The activity complexity values can then be translated into activity points (e.g., directly or using an activity point scale).

In a specific embodiment, activity points are calculated from activity complexity values using an activity point scale. The activity point scale can assign activity points to different ranges of activity complexity values. A uniform scale can be used or the scale can be varied by activity. Furthermore, the activity point values can be customized for each activity. For example, a uniform activity point scale can be used for all activities (e.g., a scale with ranges of activity complexity values such as 1, 1.0-1.5, 1.5-2.0, 2.0-2.5, and so on). For a first activity, activity points could be assigned based on the activity point scale as follows: 3 activity points for the range 1.0-1.5, 4, activity points for the range 1.5-2.0, 5, activity points for the range 2.0-2.5, and so on. For a second activity, activity points could be assigned differently, for example: 18, activity points for the range 1.0-1.5, 24, activity points for the range 1.5-2.0, 30, activity points for the range 2.0-2.5, and so on. Assigning different activity point values for different activities can reflect the amount of effort of one activity compared to another activity.

Calculating Effort

In the techniques and solutions described herein, effort can be calculated for a package implementation program. For example, effort can be calculated for the various program phases using the activity point values associated with the various program phases. An overall effort of the package implementation program can be calculated from the effort totals from each program phase.

In some embodiments, activity point totals for each program phase (or for each role within each program phase) are calculated by adding the activity point values associated with the program phase (or the role within the program phase). The activity point totals can be converted to effort using a productivity metric. The productivity metric can be specific to the type of package implementation program (e.g., the type can refer to the package manufacturer, such as SAP or Oracle) and it can be determined, for example, based on empirical data obtained from past programs. For example, a program phase such as "configuration and development" could have an activity point total of 780. If the productivity metric is 20, activity points per person month, then the effort could be calculated as follows: 780, activity points/20, activity points per person month=39, person months. In a specific implementation, productivity metrics generated from empirical results have resulted in productivity metrics of 20, activity points per person month for some types of large-scale implementation programs and 18, activity points per person month for other types of large-scale implementation programs. In some implementations, effort is reduced by a reusability value. For example, if a specific program role (or other program division, such as program phase) has a 20% reusability value associated with it, then effort calculations for that role can be reduced by 20%.

In other embodiments, activity points can be totaled for all the selected activities for the package implementation program. The total activity points can then be divided by the productivity metric to determine the overall effort.

Determining Overall Effort of a Package Implementation Program

In the techniques and solutions described herein, methods can be provided for determining overall effort for a package implementation program. For example, determining overall effort for a package implementation program can comprise one or more of the following operations: determining program parameters, determining program phases, determining program work streams, determining activities, calculating activity complexity values, calculating activity point values, calculating effort, and calculating overall effort.

FIG. 1 depicts an example method 100 for determining overall effort for a package implementation program. At 110, program parameter complexity values are determined for each of a plurality of program parameters. For example program parameter complexity values can be determined by receiving answers to questions associated with the program parameters (with each answer associated with a complexity value), and calculating the program parameter complexity values using the complexity values associated with the answers to the questions.

At 120, activities are determined for program phases and program work streams. For example, the activities can be determined based on a selection of program phases and/or program work streams. For example, each activity can be associated with a specific program phase and a specific program work stream. If either a program phase or program work stream associated with an activity is selected, then that activity can be selected. If, however, both the program phase and program work stream associated with the activity are not selected, then the activity can be unselected.

At 130, activity point values are calculated for each determined activity 120. The activity point values can be calculated using, at least in part, the determined program parameter complexity values 110. For example, for each activity, a weight value for each program parameter can be obtained, an activity complexity value for the activity can be calculated using the weight values for each program parameter and the parameter complexity values, and the activity point value can be determined (e.g., using an activity point scale).

At 140, overall effort is calculated for the package implementation program. The overall effort can be calculated using, at least in part, the activity point values 130 and a pre-determined productivity metric (e.g., a productivity metric that is specific to a type of the package implementation program). For example, the overall effort can be calculated by calculating effort for each activity using a per-determined productivity metric and calculating overall effort by, at least in part, summing the effort for each activity. Overall effort can also be calculated by calculating effort for each phase (based on the activities for each phase) and then calculating overall effort by, at least in part, summing the effort for each phase.

The calculated overall effort 140 for the package implementation program can be output. For example, the overall effort can be saved to a file, displayed to a user (e.g., a manager in charge of developing a proposal for the package implementation program), or output in another way (e.g., emailed).

Figure 2:
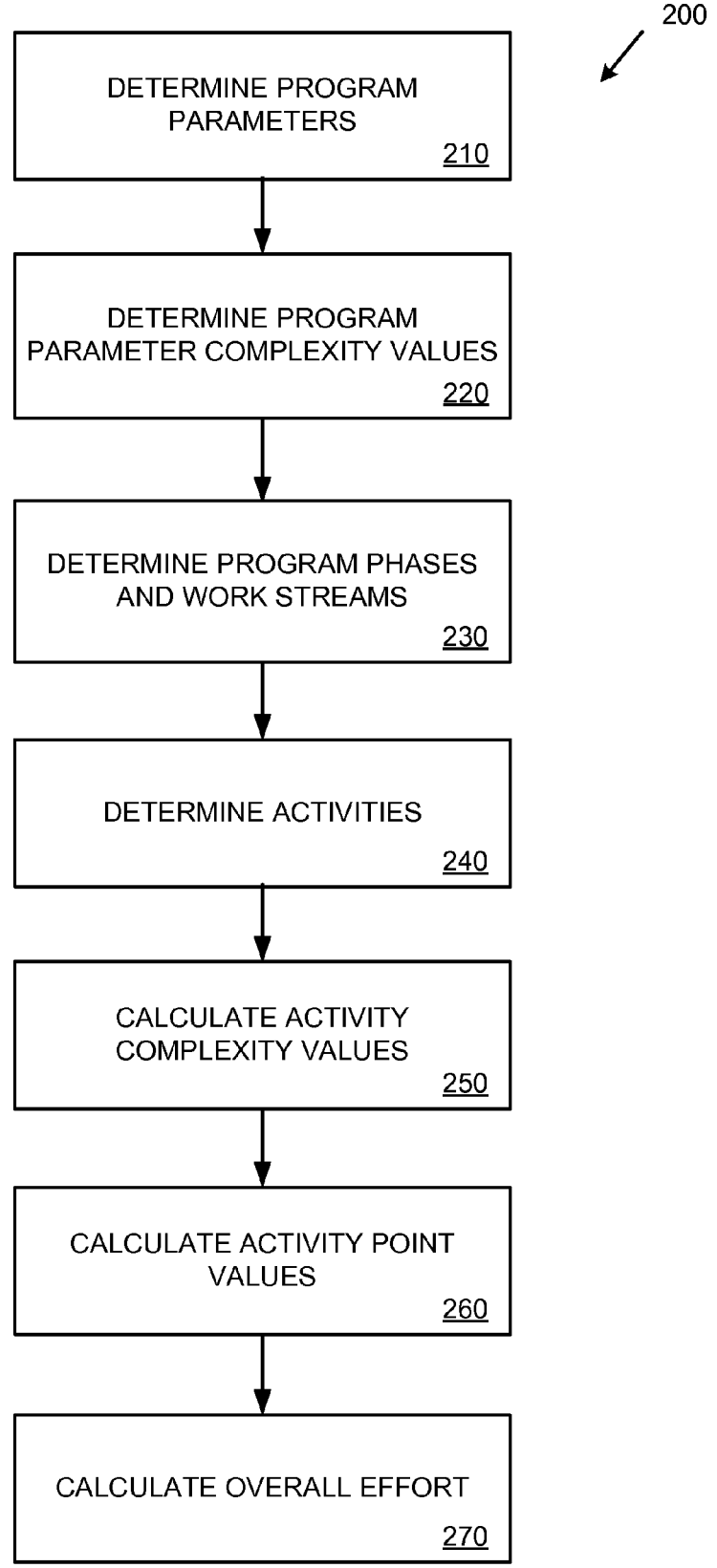
FIG. 2 is a flowchart depicting another example method for determining overall effort for a package implementation program.

FIG. 2 depicts another example method 200 for determining overall effort for a package implementation program. At 210, program parameters are determined. For example, a user interface can be provided for receiving a selection of program parameters from a pre-determined list of possible program parameters.

At 220, program parameter complexity values are determined for the determined program parameters 210. For example, the program parameter complexity values can be determined based answers received to questions associated with the program parameters.

At 230, program phases and program work streams are determined. For example, a user interface can be provided for receiving a selection of program phases and program work streams from a pre-determined list of possible program phases and a pre-determined list of possible program work streams. Selected program phases and work streams can be used to determine which activities apply (and which activities do not apply) to the package implementation program.

At 240, activities are determined. For example, activities can be determined based on the determined program phases and work streams 230 (e.g., determined from a pre-determined set of possible activities).

At 250, activity complexity values are calculated. For example, the activity complexity values can be calculated based, at least in part, upon the determined program parameter complexity values 220. Individual weightings can also be applied for each program parameter complexity value for each activity (e.g., used in a weighted sum calculation).

At 260, activity point values are calculated for each determined activity 240 based on the calculated activity complexity values 250. The activity point values can be calculated separately or as a group (e.g., grouped according to determined program phases).

At 270, overall effort is calculated based on the calculated activity point values 260. For example, the overall effort can be calculated by calculating effort for each activity point value 260 using a productivity metric. Effort totals can also be calculated based on other groupings (e.g., effort can be calculated based on program phase, program work stream, and/or role).

Tools for Estimating Overall Effort of a Package Implementation Program

In the techniques and solutions described herein, tools can be provided for estimating overall effort of a package implementation program. For example, a tool can include software that provides various user interfaces for receiving selection of various parameters involved in calculating overall effort. The tool can comprise software code, web pages, spreadsheets, and other types of software.

Figure 3:
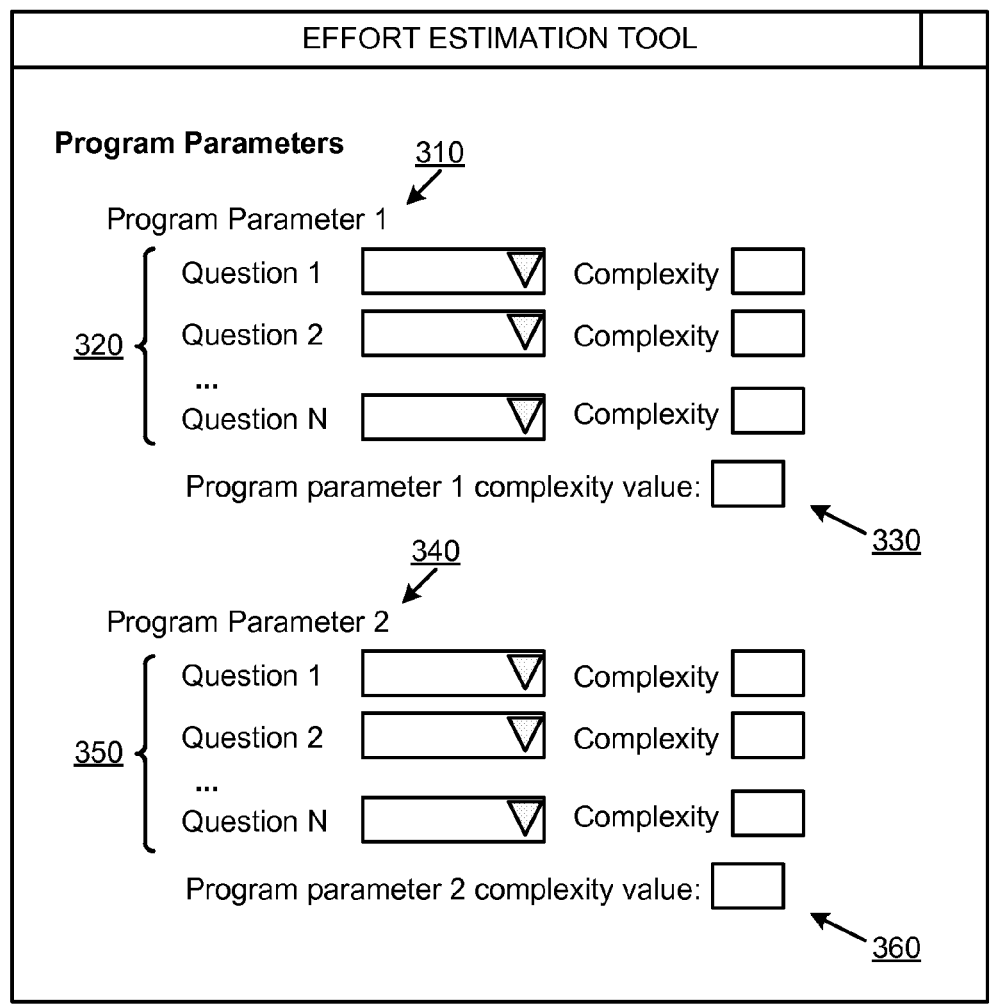
FIG. 3 is an example user interface for receiving selection of program parameters and displaying program parameter complexity values.

FIG. 3 is an example user interface 300 for receiving selection of program parameters and displaying program parameter complexity values. Using the user interface 300, a user can select answers for a number of questions 320 associated with a first program parameter 310. Each answer can be associated with a complexity value (e.g., an intermediate complexity value associated with the selected answer and used, at least in part, in determining the program parameter complexity value). Once the questions 320 have been completed for program parameter 1, a complexity value for program parameter 1, can be calculated 330.

Using the user interface 300, a user can select answers for a number of questions 350 associated with a second program parameter 340. Once the questions 350 have been completed for program parameter 2, a complexity value for program parameter 2, can be calculated 360.

For example, program parameter 310 could be an "organization" program parameter. Program parameter 310 could be associated with a number of questions 320, such as a first question: "Please provide an estimate of the number of end users for this program." Depending on the answer to the first question, the associated complexity value of the answer would be displayed. The program parameter complexity value for the first program parameter 310 can then be calculated and displayed 330 using the individual complexity values associated with the answer to each question 320.

The user interface 300 can receive answers for additional program parameters (in addition to program parameters 310 and 340). For example, the user interface 300 can receive answers for a set of pre-determined program parameters.

Figure 4:
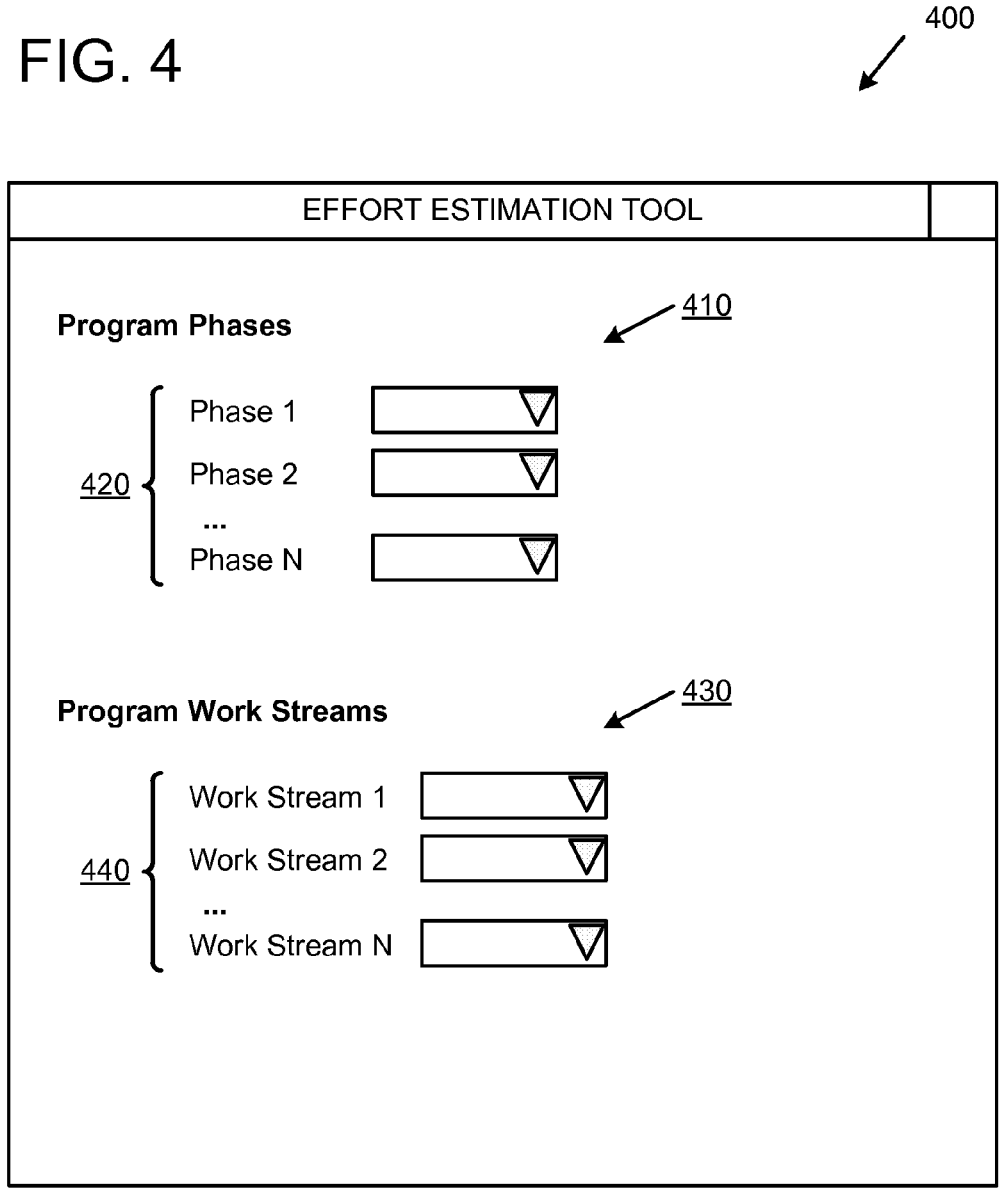
FIG. 4 is an example user interface for receiving selection of program work phases and program work streams.

FIG. 4 depicts an example user interface 400 for receiving selection of program phases 410 and program work streams 430. In the example user interface 400, a number of program phases are listed 420 (e.g., a set of pre-defined program phases). Each program phase 420 is associated with a selection box (e.g., a drop-down box for selecting a "yes" or "no" answer) for receiving an indication of whether the program phase is included in the scope of the current package implementation program.

In the example user interface 400, a number of program work streams are listed 440 (e.g., a pre-defined set of program work streams). Each program work stream 440 is associated a selection box (e.g., a drop-down box for selecting a "yes" or "no" answer) for receiving an indication of whether the program work stream is included in the scope of the current package implementation program.

FIG. 5 depicts an example user interface 500 for determining activities 510 for a package implementation program (e.g., for determining those activities that are within the scope of the current package implementation program). In the user interface, activities are listed 510 according to their associated program phase and work stream. Specifically, a set of activities are associated with a first program phase 520, another set of activities are associated with a second program phase 530, and yet another set of activities are associated with a third program phase 540. Generally, the user interface 500 can depict activities associated with one or more program phases that are part of the package implementation program.

Each activity is associated with an indicator of whether the activity is within the scope of the package implementation program. Whether any given activity is within the scope can be determined based on selected program phases, selected work streams, or other criteria (e.g., activities can be automatically selected based on selection of program phases and work streams, such as via the user interface depicted in FIG. 4). In the example list of activities 510, from the list of activities associated with the first program phase 520, all but activity 1-4, is within the scope of the package implementation program. For example, activity 1-4, maybe outside the scope of the program because work stream 2, was not selected. Alternatively, user interface 500 can provide for user selection (e.g., manual selection) of individual activities (e.g., a user could have manually selected "no" for activity 1-4).

In the example list of activities 510, from the list of activities associated with the third program phase 540, both activities are outside the scope of the program. For example, these two activities could have been automatically determined to be outside the scope due to the third program phase being unselected, or these two activities could have been manually unselected.

FIG. 6 depicts an example user interface 600 displaying calculated activity complexity values. At 610, a number of activities are displayed (e.g., a list of activities that have been selected for the current package implementation program, such as via the user interface depicted in FIG. 5). At 620, a number of program parameters are depicted along with corresponding weight values for each program parameter for each activity. At 630, calculated activity complexity values are listed for each activity.

For example, the activity complexity value for the first activity can be calculated using a weighted sum of the program parameter complexity values (for program parameters 1–, N) and displayed at 630.

Figure 7:
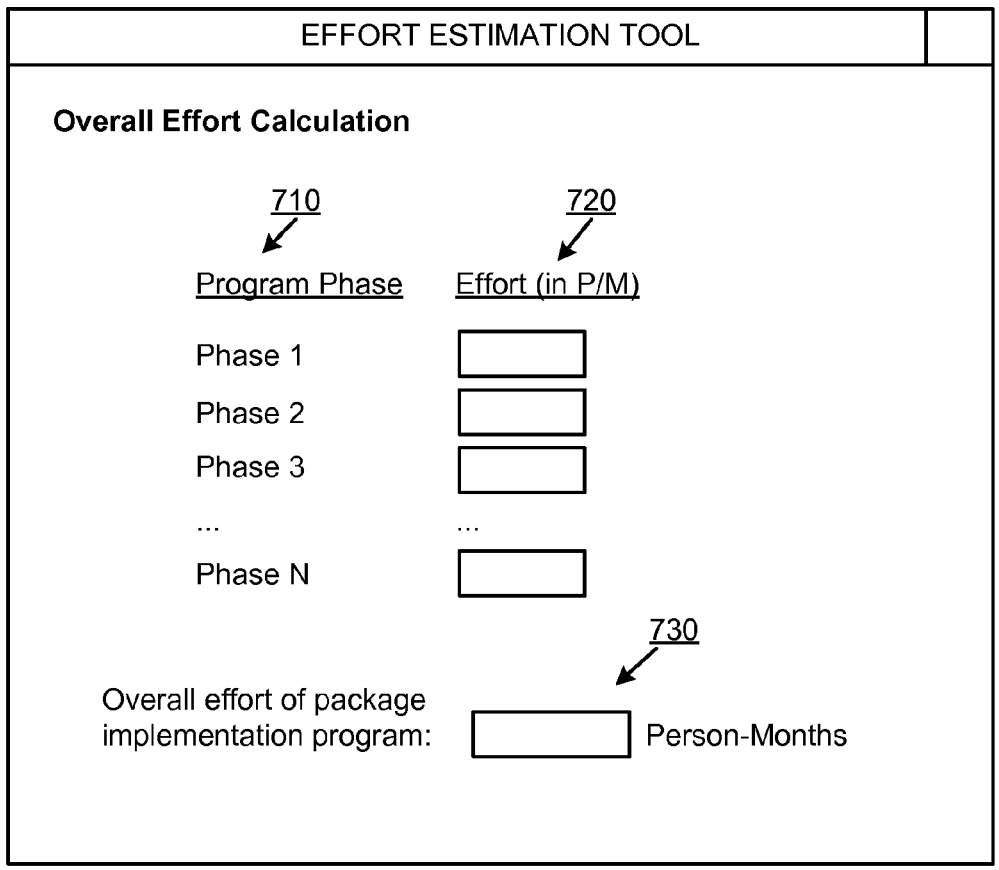
FIG. 7 is an example user interface displaying an overall effort calculation for a package implementation program.

FIG. 7 depicts an example user interface 700 displaying an overall effort calculation for a package implementation program. At 710, the program phases involved with the package implementation program are listed along with associated effort values 720 in person-months. For example, the effort 720 for each program phase 710 can be calculated based on activity point values for associated activities using a productivity metric. At 730, the overall effort of the package implementation program is depicted. For example, the overall effort 730 can be calculated by adding the effort values 720 of the individual program phases 710.

Program Estimation Framework Example

Figure 8:
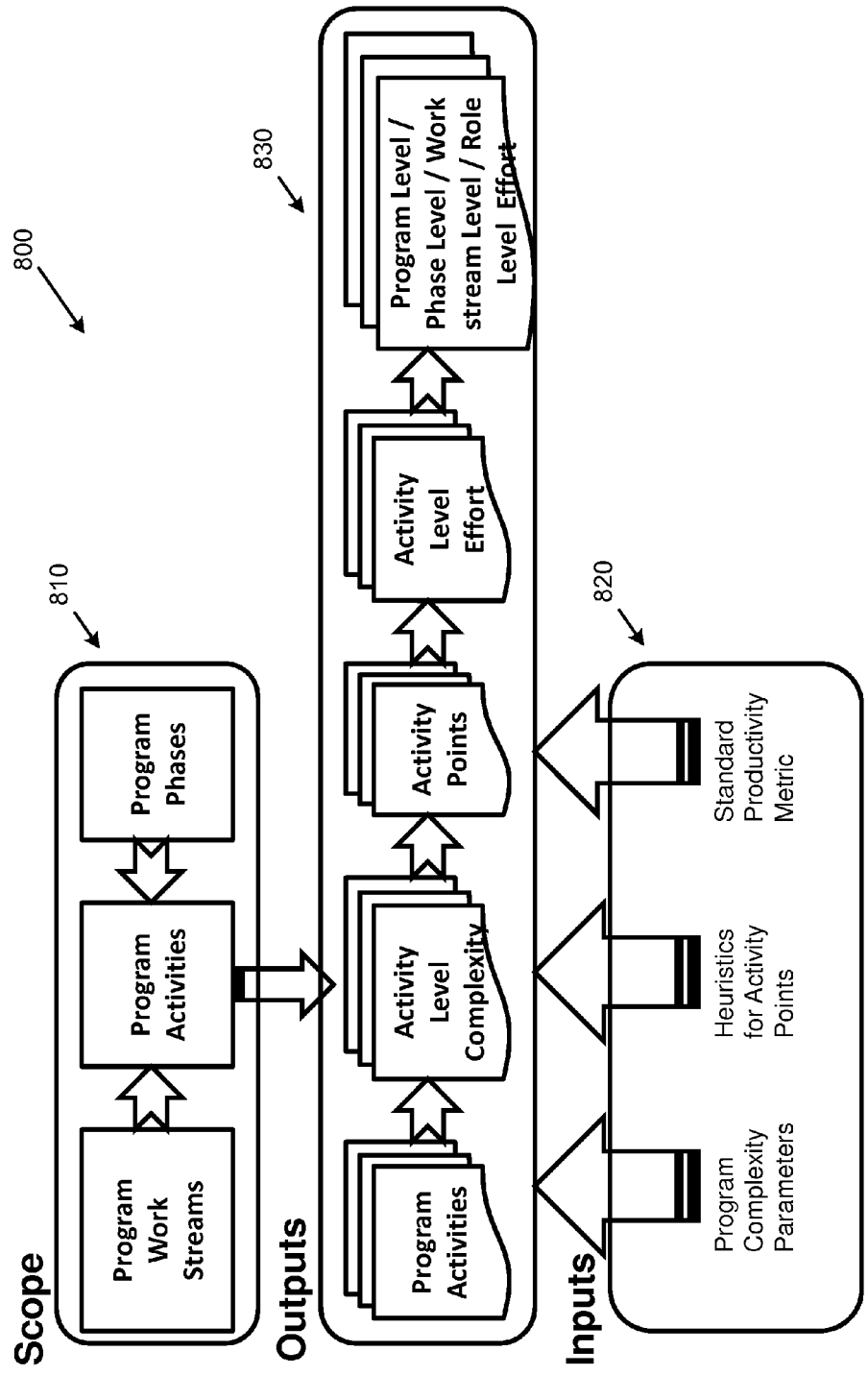
FIG. 8 is a block diagram depicting an example program estimation framework.

In the techniques and solutions described herein, a program estimation framework can be provided for estimating overall effort of a package implementation program. FIG. 8 is a block diagram depicting an example program estimation framework 800. The example framework 800 depicts the flow of information in the overall effort calculation. For example, scope 810 is determined from selected program work streams, selected program phases, and selected program activities (e.g., which can be determined automatically from selected program phases and selected program work streams). Inputs 820 to the framework include program complexity parameters, heuristics for activity points (e.g., weights and/or activity point scales), and a standard productivity metric. The framework 800 proceeds to perform various calculations using the scope 810 and inputs 820 to produce various effort estimates 830.

Figure 9:
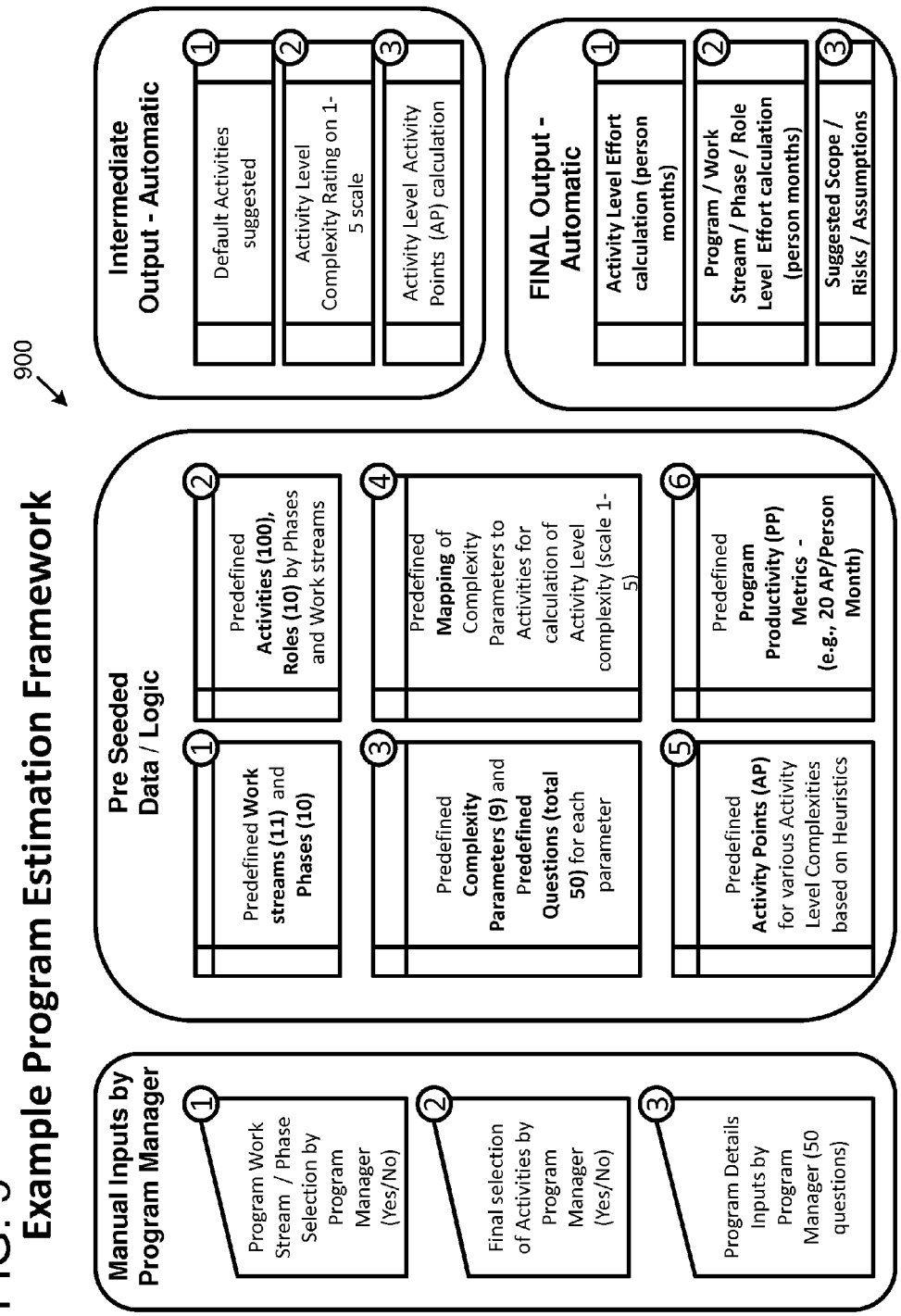
FIG. 9 is a block diagram depicting an example program estimation framework tool.

FIG. 9 is a block diagram depicting components 900 of an example program estimation framework tool. The diagram illustrates components 900 for the various inputs, logic, and outputs involved with the tool.

Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 10:
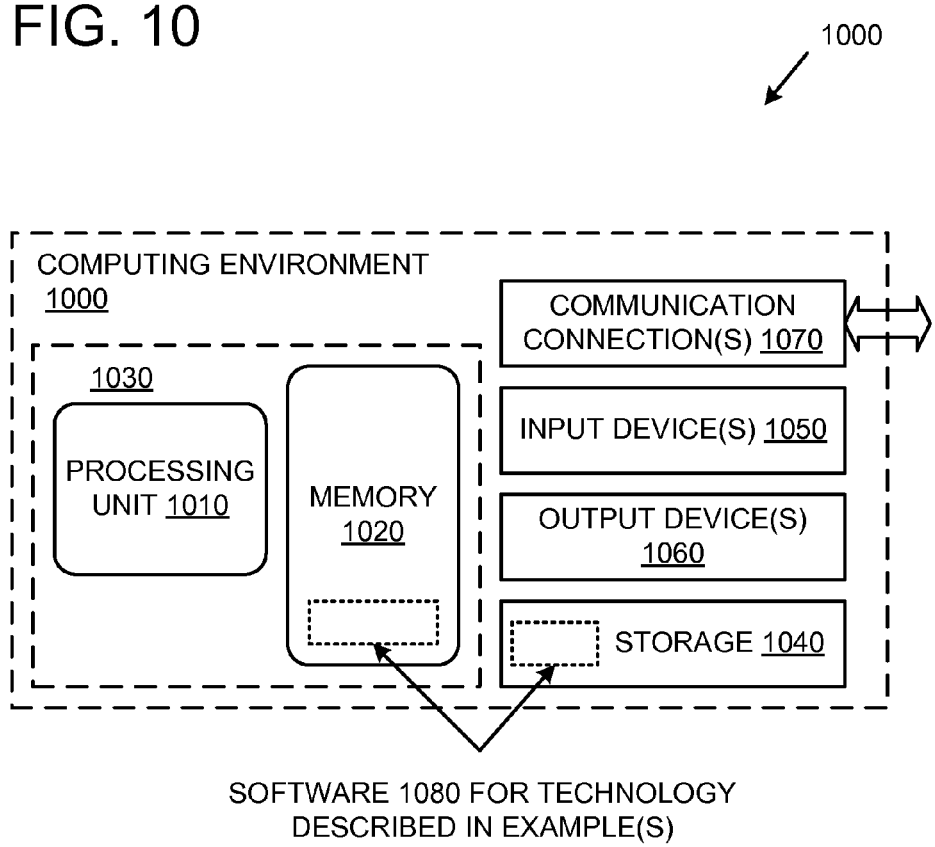
FIG. 10 is a block diagram illustrating an example computing device in conjunction with which techniques and tools described herein may be implemented.

FIG. 10 illustrates a generalized example of a suitable computing environment 1000 in which described embodiments, techniques, and technologies may be implemented. The computing environment 1000 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, the computing environment 1000 includes at least one central processing unit 1010 and memory 1020. In FIG. 10, this most basic configuration 1030 is included within a dashed line. The central processing unit 1010 executes computer-executable instructions. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement the technologies described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other tangible storage medium which can be used to store information and which can be accessed within the computing environment 1000. The storage 1040 stores instructions for the software 1080, which can implement technologies described herein.

The input device(s) 1050 may be a touch input device, such as a keyboard, keypad, mouse, pen, or trackball, a voice input device, a scanning device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, or another device that provides output from the computing environment 1000.

The communication connection(s) 1070 enable communication over a communication medium (e.g., a connecting network) to another computing entity. The communication medium conveys information such as computer-executable instructions, compressed graphics information, or other data in a modulated data signal.

Services can be provided by the cloud through service providers or through other providers of online services. Thus, the techniques and solutions described herein can be implemented with any of the connected devices as a client computing device. Similarly, any of various computing devices in the cloud or a service provider can perform the role of server computing device and deliver data to the connected devices.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable storage media include non-removable memory and removable memory (e.g., collectively 1020). As should be readily understood, the term computer-readable storage media does not include communication connections (e.g., 1070) such as modulated data signals. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, .Net, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented at least in part by a computing device, for determining overall effort in person-months for a package implementation program, the method comprising:

determining a program aspect parameter complexity value for each of a plurality of program aspect parameters;

determining activities for program phases and program work streams; calculating, by the computing device, an activity point value for each determined activity, wherein the activity point values are calculated using, at least in part, the program aspect parameter complexity values and heuristics;

calculating, by the computing device, overall effort in person-months for the package implementation program, wherein the calculating the overall effort uses, at least in part, the activity point values and a pre-determined productivity metric that is specific to a type of the package implementation program; and displaying, by the computing device, the calculated overall effort in person- months for the package implementation program;

wherein the calculating overall effort in person-months for the package implementation program comprises: calculating end-to-end effort for the package implementation program in activity points; and converting end-to-end effort for package implementation program in activity points to calculating the overall effort in person-months by use of a baseline program productivity metric; wherein the calculating end-to-end effort calculates the effort in all phases of the program from beginning to end.

2. The method of claim 1 wherein the determining the program aspect parameter complexity value for each of a plurality of program aspect parameters comprises, for each program aspect parameter:

receiving, from a user, answers to a plurality of questions associated with the program aspect parameter, wherein each answer is associated with a complexity value; and calculating, by the computing device, the program aspect parameter complexity value for the program aspect parameter by calculating a weighted sum of the complexity values associated with the answers to the plurality of questions and wherein the weighted sum uses a weight value associated with each question.

3. The method of claim 2 further comprising receiving, from a user, a firm answer or an assumed answer to a question associated with a designated firm answer and assumed answer; and calculating, by the computing device, reliability of the generated overall effort in person-months for the package implementation program.

4. The method of claim 1 wherein the determining activities for program phases and program work streams comprises:

receiving, from a user, a selection of one or more program phases from a list of possible phases of the package implementation program;

receiving, from the user, a selection of one or more work streams from a list of possible work streams for the package implementation program, wherein the list of possible work streams comprises program management, program setup, strategic planning, legal and contractual compliance, knowledge management, stakeholder management, organization change management, financial management, risk management, governance and communication, project management, performance management, and delivery management; and determining, by the computing device, the activities that are associated with the selected one or more program phases and the selected one or more work streams, wherein each activity is associated with a program phase and a work stream.

5. The method of claim 1 wherein the calculating an activity point value for each determined activity comprises:

for each activity:

obtaining a weight value for each program aspect parameter; and calculating an activity complexity value for the activity using the weight values for the program aspect parameters and the program aspect parameter complexity values; and determining the activity point value for the activity by comparing the activity complexity value to an activity point scale associated with the activity, wherein the activity point scale assigns activity point values for ranges of activity complexity values.

6. The method of claim 1 wherein the plurality of program aspect parameters comprise:

an organization program aspect parameter;
a current information technology (IT) landscape program aspect parameter;
a program core team readiness program aspect parameter;
a stakeholders program aspect parameter;
a process program aspect parameter;
a statutory/legal program aspect parameter;
a product fitment program aspect parameter;
a technology program aspect parameter;
an approach program aspect parameter; and
a people transformation program aspect parameter.

7. The method of claim 1 wherein the program phases comprise:

a package evaluation phase;
a business case and program roadmap phase;
a program set direction phase;
a process modeling/blueprinting phase;
a solution design phase;
a configuration and development phase;
a testing phase;
a training phase;
a deployment and cutover phase; and
a post-go-live support phase.

8. A computing device for determining overall effort in person-months for a package implementation program, the computing device comprising:

a display;
a memory; and
a processing unit;

wherein the computing device is configured for performing operations comprising: determining a program aspect parameter complexity value for each of a plurality of program aspect parameters;

determining activities for program phases and program work streams;

calculating, by the computing device, an activity point value for each determined activity, wherein the activity point values are calculated using, at least in part, the program aspect parameter complexity values and heuristics;

calculating, by the computing device, overall effort in person-months for the package implementation program, wherein the calculating the overall effort uses, at least in part, the activity point values and a pre-determined productivity metric that is specific to a type of the package implementation program; and displaying, by the computing device, the calculated overall effort in person-months for the package implementation program;

wherein the calculating overall effort in person-months for the package implementation program comprises: calculating end-to-end effort for the package implementation program in activity points: and converting end-to-end effort for package implementation program in activity points to calculating the overall effort in person-months by use of a baseline program productivity metric; wherein the calculating end-to-end effort calculates the effort in all phases of the program from beginning to end.

9. The computing device of claim 8 wherein the determining the program aspect parameter complexity value for each of a plurality of program aspect parameters comprises, for each program aspect parameter:

receiving, from a user, answers to a plurality of questions associated with the program aspect parameter, wherein each answer is associated with a complexity value; and calculating, by the computing device, the program aspect parameter complexity value for the program aspect parameter using, at least in part, the complexity values associated with the answers to the plurality of questions.

10. The computing device of claim 8 wherein the determining activities for program phases and program work streams comprises:
receiving, from a user, a selection of one or more program phases from a list of possible phases of the package implementation program;
receiving, from the user, a selection of one or more work streams from a list of possible work streams for the package implementation program, wherein the list of possible work streams comprise program management, program setup, strategic planning, legal and contractual compliance, knowledge management, stakeholder management, organization change management, financial management, risk management, governance and communication, project management, performance management, and delivery management; and
determining, by the computing device, the activities that are associated with the selected one or more program phases and the selected one or more work streams, wherein each activity is associated with a program phase and a work stream.

11. The computing device of claim 8 wherein the calculating an activity point value for each determined activity comprises:
for each activity:
obtaining a weight value for each program aspect parameter; and
calculating an activity complexity value for the activity using the weight values for the program aspect parameters and the program aspect parameter complexity values; and
determining the activity point value for the activity by comparing the activity complexity value to an activity point scale associated with the activity, wherein the activity point scale assigns activity point values for ranges of activity complexity values.

12. A computer-readable storage media storing computer-executable instructions for execution on a computing device to perform a method for determining overall effort in person-months for a package implementation program, the method comprising:
determining a program parameter complexity value for each of a plurality of program parameters;
determining activities for program phases and program work streams;
calculating, by the computing device, an activity point value for each determined activity, wherein the activity point values are calculated using, at least in part, the program aspect parameter complexity values and heuristics;
calculating, by the computing device, overall effort in person-months for the package implementation program, wherein the calculating the overall effort uses, at least in part, the activity point values and a pre-determined productivity metric that is specific to a type of the package implementation program; and
displaying, by the computing device, the calculated overall effort in person-months for the package implementation program;
wherein the calculating overall effort in person-months for the package implementation program comprises: calculating end-to-end effort for the package implementation program in activity points; and converting end-to-end effort for package implementation program in activity points to calculating the overall effort in person-months by use of a baseline program productivity metric; wherein the calculating end-to-end effort calculates the effort in all phases of the program from beginning to end.

13. The computer-readable storage media of claim 12 wherein the determining the program aspect parameter complexity value for each of a plurality of program aspect parameters comprises, for each program aspect parameter:
receiving, from a user, answers to a plurality of questions associated with the program aspect parameter, wherein each answer is associated with a complexity value; and
calculating, by the computing device, the program aspect parameter complexity value for the program aspect parameter using, at least in part, the complexity values associated with the answers to the plurality of questions.

14. The computer-readable storage media of claim 12 wherein the determining activities for program phases and program work streams comprises:
receiving, from a user, a selection of one or more program phases from a list of possible phases of the package implementation program;
receiving, from the user, a selection of one or more work streams from a list of possible work streams for the package implementation program, wherein the list of possible work streams comprise program management, program setup, strategic planning, legal and contractual compliance, knowledge management, stakeholder management, organization change management, financial management, risk management, governance and communication, project management, performance management, and delivery management; and
determining, by the computing device, the activities that are associated with the selected one or more program phases and the selected one or more work streams, wherein each activity is associated with a program phase and a work stream.

15. The computer-readable storage media of claim 12 wherein the calculating an activity point value for each determined activity comprises:
for each activity:
obtaining a weight value for each program aspect parameter; and
calculating an activity complexity value for the activity using the weight values for the program aspect parameters and the program aspect parameter complexity values; and
determining the activity point value for the activity by comparing the activity complexity value to an activity point scale associated with the activity, wherein the activity point scale assigns activity point values for ranges of activity complexity values.

* * * * *